(12) United States Patent
Raeckers et al.

(10) Patent No.: US 9,896,180 B2
(45) Date of Patent: Feb. 20, 2018

(54) METHOD FOR MANUFACTURING A LOAD BEARING STRUCTURE AND SUCH A LOAD BEARING STRUCTURE

(71) Applicant: Airbus Operations GmbH, Hamburg (DE)

(72) Inventors: Bernd Raeckers, Bremen (DE); Sven Werner, Buxtehude (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/699,316

(22) Filed: Apr. 29, 2015

(65) Prior Publication Data
US 2015/0321743 A1 Nov. 12, 2015

(30) Foreign Application Priority Data

May 6, 2014 (EP) ..................................... 14167237

(51) Int. Cl.
*B64C 1/06* (2006.01)
*B64C 1/12* (2006.01)
(Continued)

(52) U.S. Cl.
CPC .............. *B64C 1/064* (2013.01); *B64C 1/061* (2013.01); *B64C 1/12* (2013.01); *B64F 5/00* (2013.01);
(Continued)

(58) Field of Classification Search
CPC .. B64C 1/064; B64C 1/12; B64C 5/00; B64C 1/061; B64C 2001/0072;
(Continued)

(56) References Cited

U.S. PATENT DOCUMENTS 2,389,767 A 11/1945 Dalton
3,623,936 A 11/1971 Hotz
(Continued)

FOREIGN PATENT DOCUMENTS

DE 10 2009 056 997 A1 6/2011
DE 10 2009 056 998 A1 6/2011
(Continued)

OTHER PUBLICATIONS

EP Search Report dated Nov. 27, 2014 (EP 14167237.8).

*Primary Examiner* — Adriana Figueroa
*Assistant Examiner* — Jessie T Fonseca
(74) *Attorney, Agent, or Firm* — Lerner, David, Littenberg, Krumholz & Mentlik, LLP (57) ABSTRACT

A method for manufacturing a load bearing structure involves providing a panel; providing a first set of split stiffening elements on a surface of the panel, wherein the split stiffening elements of the first set have bottom surfaces and central portions with open top clearances, respectively, spaced apart from each other; providing a second set of stiffening elements having bottom surfaces and top surfaces and central portions, respectively; inserting the stiffening elements of the second set into respective open top clearances of the split stiffening elements of the first set and providing the second set of stiffening elements on the surface of the panel for forming a grate structure; and attaching top surfaces to the split stiffening elements of the first set for forming complete profiles.

16 Claims, 5 Drawing Sheets

(51) Int. Cl.
*B64F 5/00* (2017.01)
*B64C 1/00* (2006.01)

(52) U.S. Cl.
CPC ............ *B64C 2001/0072* (2013.01); *B64C 2001/0081* (2013.01); *Y10T 29/49623* (2015.01)

(58) Field of Classification Search
CPC .............. B64C 2001/0081; B64C 3/26; Y10T 29/49623; Y10T 29/49629; E04B 9/122; E04B 9/127; E04B 9/068; B29D 99/0014; B29C 66/721; B29C 66/52451; B29C 66/543; E04C 2/42
See application file for complete search history.

(56) References Cited

U.S. PATENT DOCUMENTS

| | | | |
|---|---|---|---|
| 4,580,387 A * | 4/1986 | Rogers | E04B 9/10 52/506.07 |
| 4,761,930 A | 8/1988 | Tepera | |
| 7,854,472 B2 | 12/2010 | Gomi | |
| 8,079,549 B2 | 12/2011 | Gouvea | |
| 2001/0035251 A1 | 11/2001 | Matsui | |
| 2003/0097809 A1 | 5/2003 | Li | |
| 2006/0226287 A1 * | 10/2006 | Grantham | B64C 1/12 244/119 |
| 2009/0057487 A1 * | 3/2009 | Velicki | B29C 70/443 244/119 |
| 2009/0320398 A1 | 12/2009 | Gouvea | |
| 2010/0285676 A1 * | 11/2010 | Ikeuchi | H01R 12/62 439/65 |
| 2010/0308165 A1 * | 12/2010 | Markowski | B29C 70/202 244/119 |
| 2011/0042519 A1 * | 2/2011 | Tacke | B64C 1/064 244/131 |
| 2015/0166168 A1 * | 6/2015 | Rackers | B29C 66/02241 244/132 |

FOREIGN PATENT DOCUMENTS

| | | | |
|---|---|---|---|
| DE | 10 2009 056 999 A1 | 6/2011 | |
| FR | 2972387 A1 * | 9/2012 | ............. B29B 11/16 |
| GB | 457369 A | 11/1936 | |
| GB | 520249 A | 4/1940 | |
| GB | 661108 A * | 11/1951 | ............... B64C 3/26 |
| GB | 665 850 A | 1/1952 | |
| WO | 2012/119762 A1 | 9/2012 | |

* cited by examiner

METHOD FOR MANUFACTURING A LOAD BEARING STRUCTURE AND SUCH A LOAD BEARING STRUCTURE

FIELD OF THE INVENTION

The present invention relates to a method for manufacturing a load bearing structure, in particular for an aircraft, and to such a load bearing structure.

BACKGROUND OF THE INVENTION

Aircraft manufacturers continuously attempt to improve aircraft performance by reducing both weight and manufacturing costs while maintaining or improving structural strength. One well-known method for increasing aircraft performance is to reduce airframe weight through the use of materials such as composites having relatively high strength-to-weight and stiffness-to-weight ratios. Composite materials are generally described as being materials that include reinforcing fibers, such as carbon fibers, embedded in a polymeric matrix, such as an epoxy resin.

Generally, load bearing structures of an aircraft comprise longitudinal stiffening elements called stringer members and circumferential stiffening elements called frame members. These stringer members and frame members are positioned on the skin panel of the fuselage of an aircraft by intersecting each other in order to form a grate structure. The skin panel, the stringer members and the frame members are usually made of the above-mentioned fiber reinforced composite materials or of aluminum.

In the intersection areas in which the stringer members and frame members are intersecting each other, one stiffening element runs across the other stiffening element. Additional elements like clips or shear webs are used in order to attach one stiffening element to the skin and the other stiffening element at these intersection areas.

Document U.S. Pat. No. 8,079,549 B2 describes structural panels for use in manufacturing fuselage bodies wherein a monolithic integrated structural panel is configured to include a skin, an array of stringer members and an array of frame members which are preferably arranged in a mutually orthogonal layout. The junctions of the frame and stringer members are fabricated from several single preformed modular junction elements. Additional bridge elements are provided for realizing the intersection areas.

BRIEF SUMMARY OF THE INVENTION

It is therefore an idea of the present invention to provide an improved method for manufacturing a load bearing structure as well as such an improved load bearing structure.

In accordance with an aspect of the invention, a method for manufacturing a load bearing structure comprises the following: providing a panel; providing a first set of split stiffening elements on a surface of said panel, wherein the split stiffening elements of said first set having bottom surfaces and central portions with open top clearances, respectively, being spaced apart from each other; providing a second set of stiffening elements having top and bottom surfaces and central portions, respectively; inserting the stiffening elements of said second set into respective open top clearances of said split stiffening elements of said first set and providing said second set of stiffening elements on said surface of said panel for forming a grate structure; and attaching top surfaces to said split stiffening elements of said first set for forming complete profiles of said stiffening elements of said first set.

Furthermore, a load bearing structure is provided, comprising: a panel; a first set of stiffening elements being provided on a surface of said panel and having top and bottom surfaces and central portions with clearances being spaced apart from each other; and a second set of stiffening elements being provided on said surface of said panel, having top and bottom surfaces and central portions and passing through said clearances of respective stiffening elements of said first set for forming a grate structure.

The advantage of the provided load bearing structure and the provided method for manufacturing the same is due to the fact that both stiffening elements can be attached directly to the panel wherein using such split profiles for the junction of perpendicular running stiffening elements reduces the number of parts and the costs. Furthermore, the height of the load bearing structure can be advantageously reduced such that more cabin space is available.

According to a first embodiment of the present invention the stiffening elements of the first or second set are formed with decreased portions in predetermined intersection areas for balancing height differences between the respective intersecting stiffening elements. In an analogous manner, the stiffening elements of the first or second set can also be formed with increased portions in predetermined intersection areas for balancing height differences between the respective intersecting stiffening elements. Hence, one stiffening element can be inserted in a corresponding clearance even though the actual height of the inserted stiffening element would be larger or smaller than the height of the stiffening element comprising the respective clearances.

According to a further embodiment of the present invention said panel is formed as a skin of a fuselage of an aircraft. It is also possible that the panel is formed as a floor panel or the same.

According to a further embodiment of the present invention said stiffening elements of said first set are formed as longitudinal stringer members and said stiffening elements of said second set are formed as circumferential frame members in a fuselage of an aircraft. It is also possible to form the stiffening elements of said first set as the circumferential frame members and said stiffening elements of said second set as the longitudinal stringer members. Also a mixture could be possible and advantageously in case different portions of the shell or frame of the fuselage of an aircraft requires different load bearing structures.

According to a further embodiment of the present invention the longitudinal stringer members are formed with substantially T or I cross-sectional configuration and the circumferential frame members are formed with a substantially C or U cross-sectional configuration. Of course other cross-sectional configurations are possible in case a respective load bearing structure requires different configurations.

According to a further embodiment of the present invention said top surfaces of said stiffening elements of the first set are attached to said split stiffening elements of said first set by bonding, welding, riveting or the same. In case said panel, said stiffening elements of said first set and said stiffening elements of said second set are made of a carbon fiber reinforced plastic, a bonding process is preferably used. In case said panel and said stiffening elements are made of aluminum, welding or riveting processes are preferably used.

BRIEF DESCRIPTION OF THE DRAWINGS

For a more complete understanding of the different aspects of the present invention and the advantages thereof, exemplary embodiments of the invention are explained in more detail in the following description with reference to the accompanying drawings, in which like reference characters designate like parts and in which.

DETAILED DESCRIPTION

The accompanying drawings are included to provide a further understanding of the different aspects of the present invention and are incorporated in and constituted apart of said specification. The drawings illustrate particular embodiments of the present invention and together with the description to serve to explain the principles underlying the present invention. Other embodiments of the invention and many advantages of the invention will be readily appreciated as they become better understood with reference to the following detailed description. It will be appreciated that common and/or well-understood elements that may be useful or necessary in a commercially feasible embodiment are not necessarily depicted in order to facilitate a more abstracted view of the embodiments. The elements of the drawings are not necessarily illustrated to scale relative to each other.

Figure 1A:
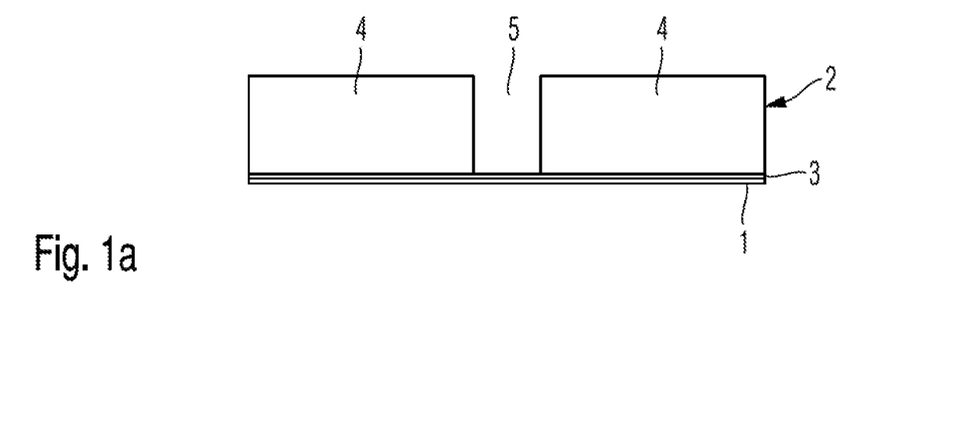
FIGS. 1a to 1c illustrate the step of providing a split stiffening element of a first set on a surface of a panel in a side view, front view and perspective view according to a first embodiment of the present invention.
Figure 1B:
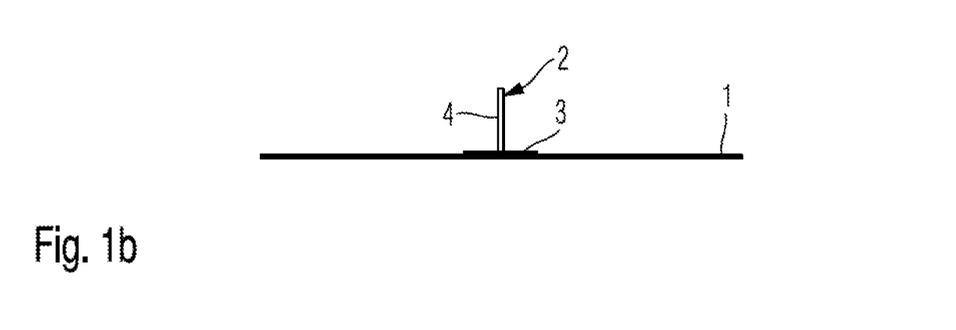
Figure 1C:
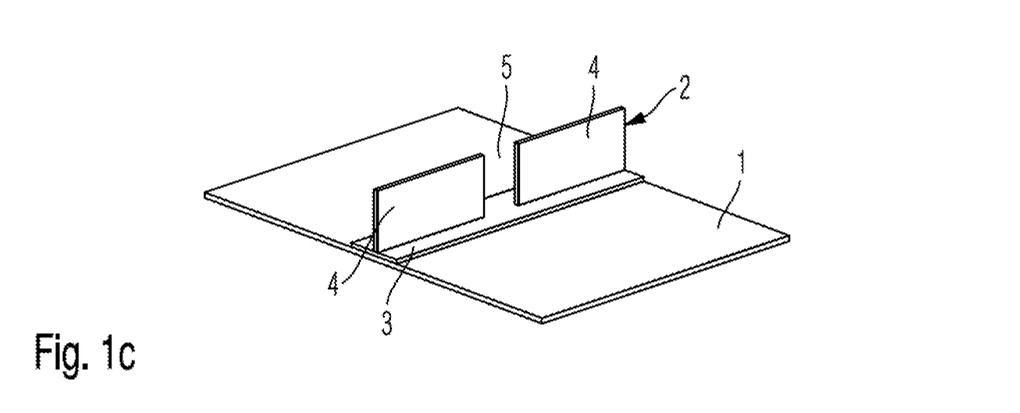

As depicted in FIGS. 1a to 1c in a side view, front view and perspective view, firstly a panel 1, for example the skin of an airframe shell made of carbon fiber reinforced plastic or aluminum, is provided, wherein a first set of split stiffening elements 2, for example split stringer members 2 made of carbon fiber reinforced plastic or aluminum, are attached on a surface of the above-mentioned panel 1. The stringer members 2 can be bonded, for example co-cured, co-bonded or secondary-bonded, welded or riveted on the panel 1 depending on the materials being used.

Figure 2A:
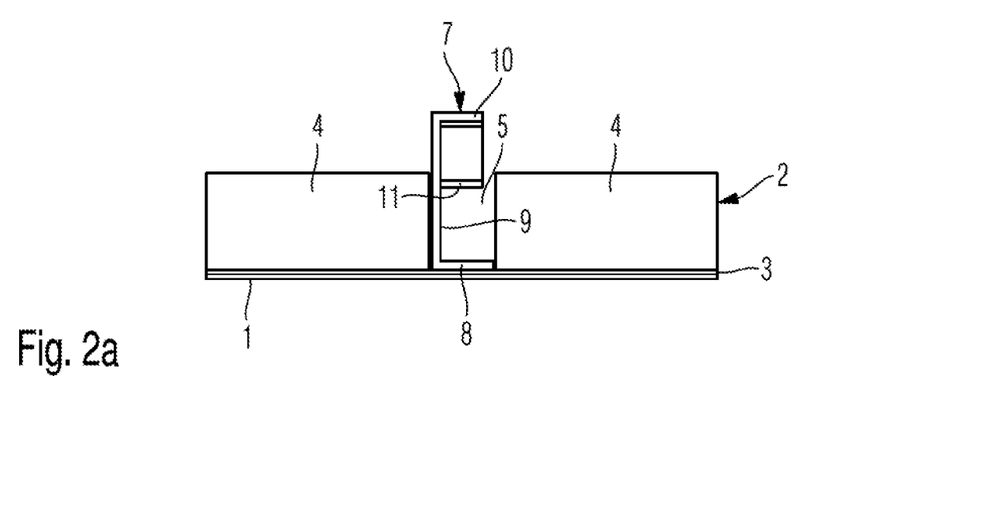
FIGS. 2a to 2c illustrate the step of inserting a stiffening element of a second set into a respective open top clearance of a split stiffening element of said first set and providing said stiffening element of said second set on said surface of said panel for forming a grate structure in a side view, front view and perspective view according to said first embodiment of the present invention.
Figure 2B:
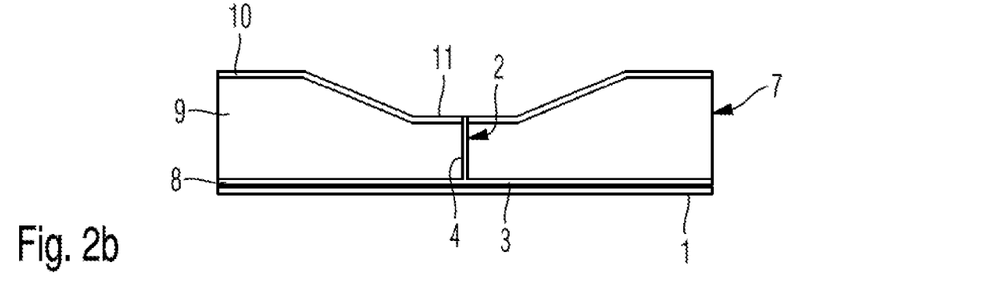
Figure 2C:
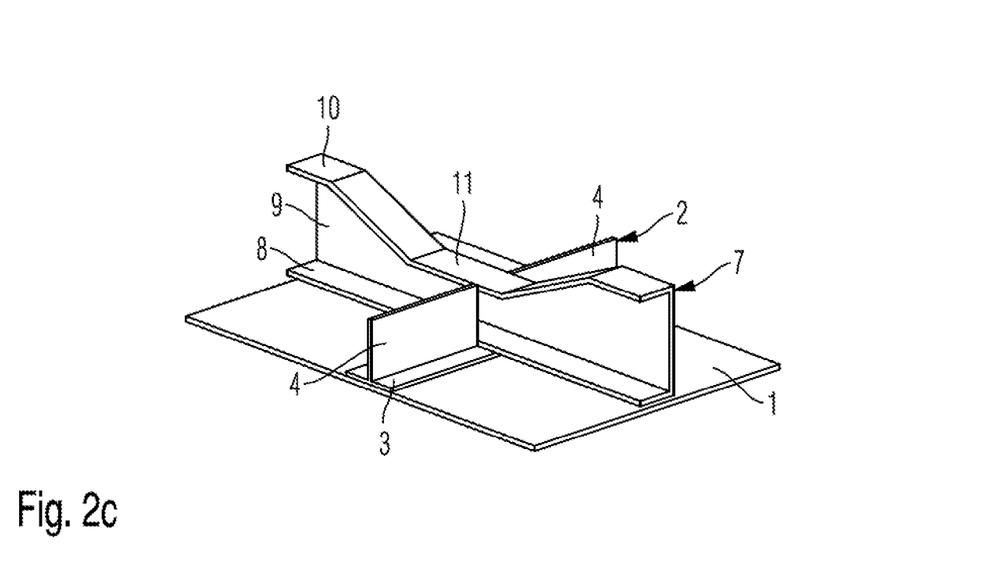
Figure 3A:
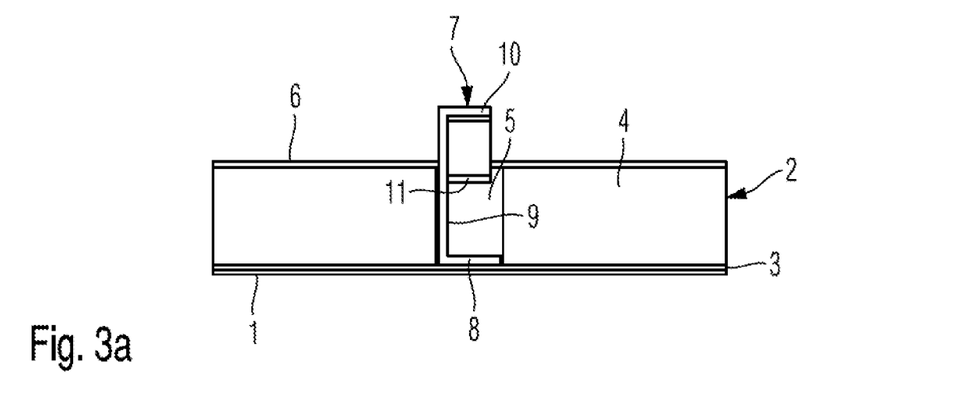
FIGS. 3a to 3c illustrate the step of attaching a top surface to said split stiffening element of said first set for forming a complete profile in a side view, front view and perspective view according to said first embodiment of the present invention.
Figure 3B:
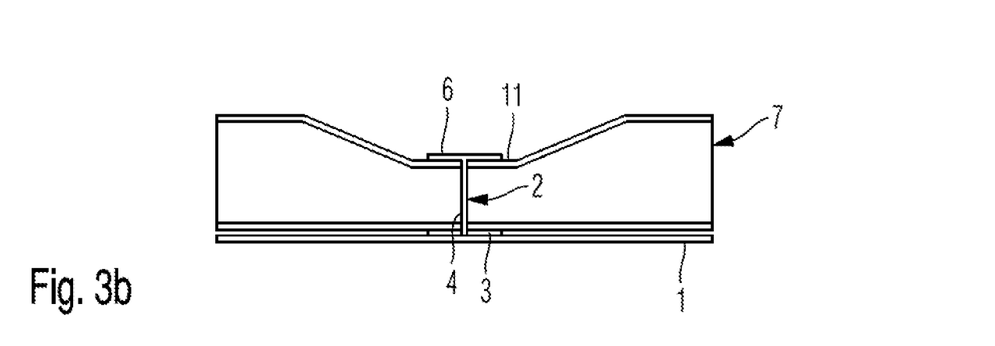
Figure 3C:
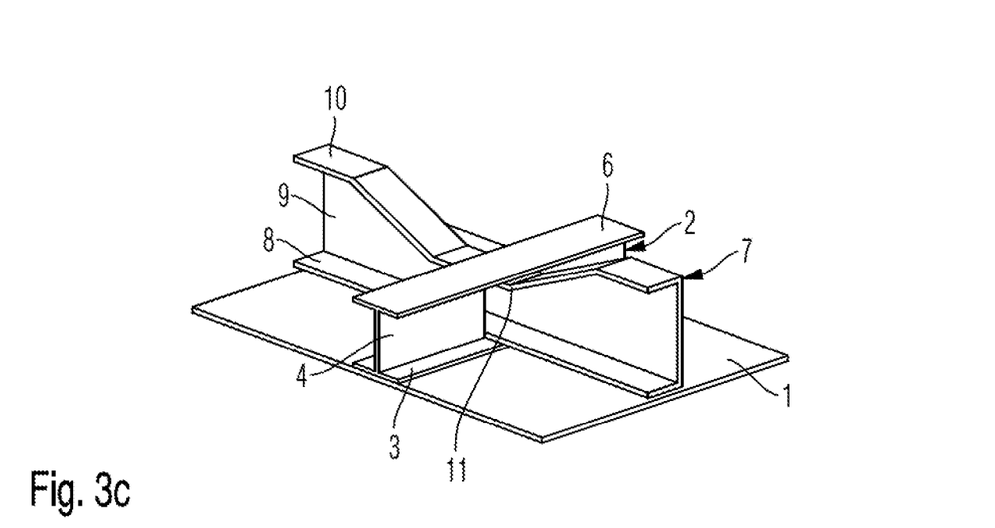

Although in FIGS. 1 to 3, merely one stringer member 2 and one frame member 7 are shown for the sake of convenience, the load bearing structure of the present invention may comprise a plurality of stringer members 2 and frame members intersecting each other for forming a respective grate structure. Possibly an array of mutually orthogonal stringer members and frame members is provided.

As shown in particular in FIGS. 1a and 1c, the split stringer members 2 of the first set according to the first embodiment of the present invention comprise a substantially T cross-sectional configuration having a bottom surface 3 and a central portion 4, respectively. The central portions preferably comprise clearances 5 being positioned in the intersection areas. The clearances 5 are formed as open top clearances in order to facilitate an insertion of corresponding stiffening elements of a second set as explained later on.

As depicted in FIGS. 2a to 2c, in a further step a second set of stiffening elements 7, for example frame members 7 made of carbon fiber reinforced plastic or aluminum, are attached on said surface of the panel 1, wherein the frame members 7 are inserted into corresponding clearances 5 of respective stringer members 2 in the intersection areas to form a grate structure. Preferably, the clearances 5 are dimensioned in accordance with the dimensions of the stiffening members to be inserted in order to optimize the intersection areas.

Analogue to the above described stringer members 2, the frame members 7 can also be bonded, for example co-cured, co-bonded or secondary-bonded, welded or riveted on the panel 1 depending on the materials being used. It is possible to attach the stringer members 2 and the frame members 7 to the panel 1 in any other suitable way.

As visible in particular in FIGS. 2b and 2c, each frame member 7 of the second set comprises in particular a C or U cross-sectional configuration having a bottom surface 8, a central portion and a top surface 10.

According to the embodiment as depicted in FIGS. 1 to 5, the stringer members 2 have a smaller height as the frame members 7 in cross-section. Therefore, the frame members 7 advantageously comprise a decreased portion 11 in the intersection areas in order to balance the height differences of the stringer members 2 and the frame members 7 in these intersection areas.

It is also possible that in case the height of the complete profiled and one-piece stiffening elements, according to the first embodiment the frame members 7, is smaller than the height of the split stiffening elements, according to the first embodiment the stringer members 2, the complete profiled and one-piece stiffening elements comprise an increased portion in the intersection areas in order to balance the different heights.

As a further step, as illustrated in FIGS. 3a to 3c in line with the first embodiment of the present invention, a top surface 6 is attached to the split stringer members 2 in order to form a complete profile. The top surface 6 is preferably bonded to the split stringer member 2 in case the stringer members 2 are made of carbon fiber reinforced plastic. In case the stringer members 2 are made of aluminum, it is preferred to rivet or weld the top surface 6 to the split profile of the stringer members 2.

Figure 4:
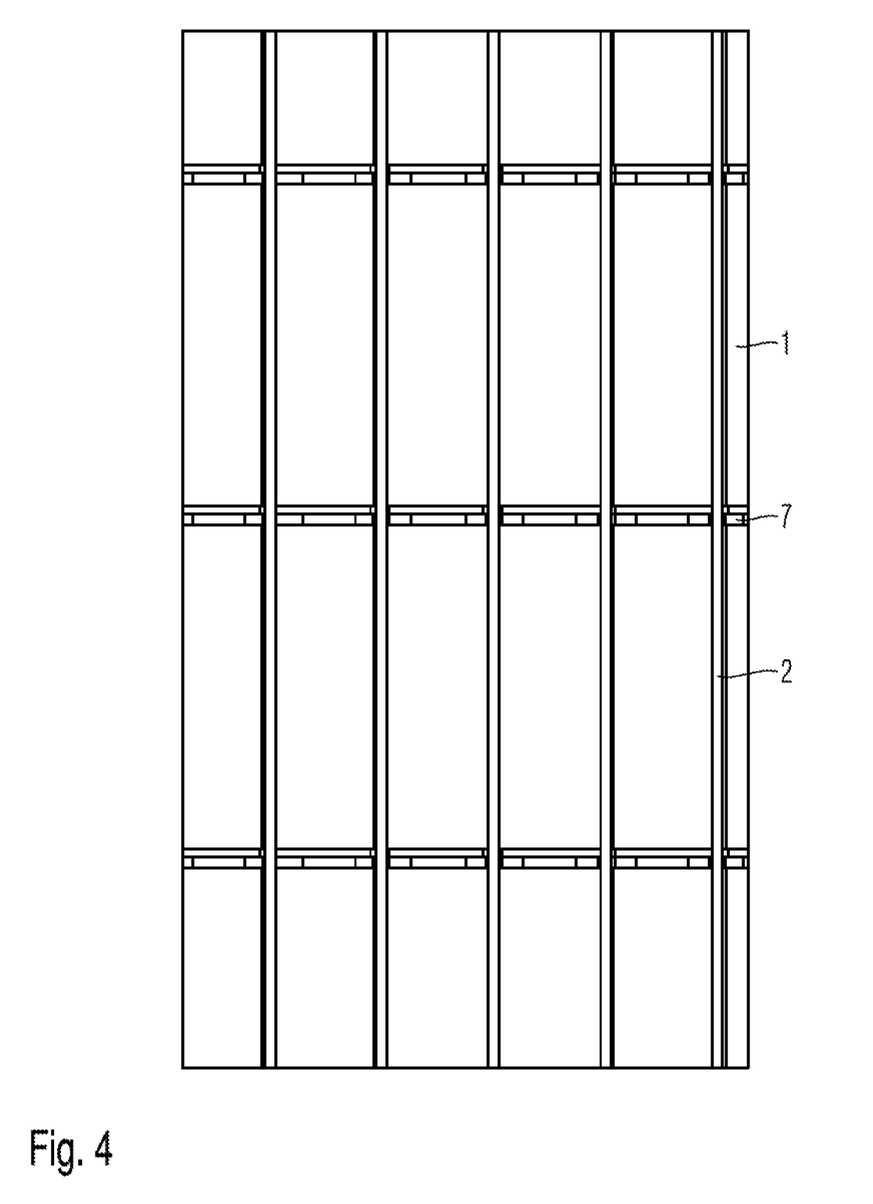
FIG. 4 illustrates a plan view of the manufactured load bearing structure according to said first embodiment of the present invention.
Figure 5:
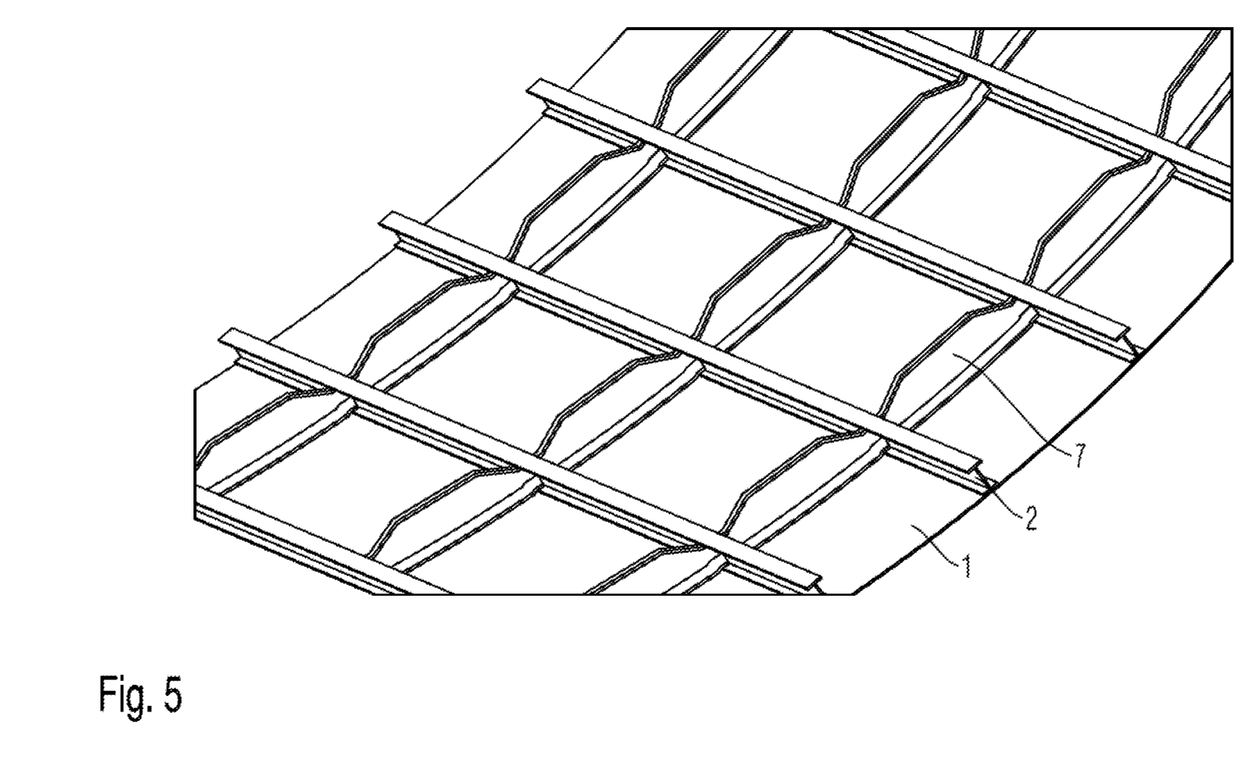
FIG. 5 illustrates a perspective view of a load bearing structure according to said first embodiment of the present invention.

As illustrated in FIG. 4 in a top view and in FIG. 5 in a perspective view, a load bearing structure in form of a grate structure is provided wherein according to the described embodiments the frame members 7 are formed as a one-piece and solid profile for taking-up the high forces inside the shell. In the illustrated embodiment, the stringer members 2 are built as split profiles in order to simplify the manufacturing process of the load bearing structure since the frame members 7 can simply be inserted into the clearances 5 of the respective stringer members in the intersection areas. Hence, no additional clips or shear webs are needed such that the present invention provides a reduction of parts and a reduction of costs. Additionally, the complete height of the load bearing structure can advantageously be reduced such that more space for cabin interiors is available.

Although the present invention is described in respect to the depicted embodiment, further embodiments are possible also lying in the scope of protection of the present invention.

For example, it is also possible to form the frame members as the split profiles and to insert the stringer members as one-piece and complete profiles in respective clearances of the frame members. Furthermore, it is also possible to provide a load bearing structure with split profiled frame members in one predetermined area and with split profiles stringer members in another predetermined area of the frame in case different structures are required in different areas of the frame.

Furthermore, it is also possible that the split stiffening elements alternatively or additionally to the complete profiled stiffening elements comprise decreased or increased portions in the intersection areas in order to balance height differences between the single members or stiffening elements.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a load bearing structure, comprising:
   providing a panel;
   providing a first set of split stiffening elements on a surface of said panel, wherein the split stiffening elements of said first set have bottom surfaces and central portions with open top clearances, respectively, spaced apart from each other;
   providing a second set of stiffening elements having bottom surfaces and top surfaces and central portions, respectively;
   inserting the stiffening elements of said second set into corresponding open top clearances of said split stiffening elements of said first set such that the bottom surfaces of the stiffening elements of the second set rest upon the bottom surfaces of the split stiffening elements of the first set and providing said second set of stiffening elements on said surface of said panel for forming a grate structure; and
   attaching top surfaces to said split stiffening elements of said first set for forming complete profiles.

2. The method according to claim 1, wherein the stiffening elements of the first set or the stiffening elements of the second set are formed with decreased portions in predetermined intersection areas for balancing height differences between the respective intersecting stiffening elements.

3. The method according to claim 1, wherein the stiffening elements of the first set or the stiffening elements of the second set are formed with increased portions in predetermined intersection areas for balancing height differences between the respective intersecting stiffening elements.

4. The method according to claim 1, wherein said top surfaces of said stiffening elements of the first set are attached to said split stiffening elements of said first set by bonding, welding or riveting or any combination thereof.

5. The method according to claim 1, wherein said panel and/or said stiffening elements of said first set and/or said stiffening elements of said second set are made of carbon fiber reinforced plastic or aluminum or any combination thereof.

6. A load bearing structure, comprising:
   a panel;
   a first set of split stiffening elements provided on a surface of said panel and having bottom surfaces and central portions with clearances spaced apart from each other in a first state; and
   a second set of stiffening elements provided on said surface of said panel, having bottom surfaces and top surfaces and central portions and passing through said clearances of said first set of split stiffening elements for forming a grate structure, the bottom surfaces of the second set of stiffening elements resting upon the bottom surfaces of the first set of split stiffening elements in vicinity of said clearances, the clearances formed as open top clearances to facilitate an insertion of corresponding stiffening elements of the second set in the first state of the first set of split stiffening elements,
   wherein, in a second state, the first set of split stiffening elements further comprises top surfaces attached thereto to form a complete profile, the top surfaces of the first set of split stiffening elements being attached to the central portions of the first set of the split stiffening elements.

7. The load bearing structure according to claim 6, wherein the split stiffening elements of the first set or the stiffening elements of the second set comprise decreased portions in predetermined intersection areas for balancing height differences between the first and second set of stiffening elements in the predetermined intersection areas.

8. The load bearing structure according to claim 6, wherein the split stiffening elements of the first set or the stiffening elements of the second set comprise increased portions in predetermined intersection areas for balancing height differences between the first and second set of stiffening elements in the predetermined intersection areas.

9. The load bearing structure according to claim 6, wherein said panel is formed as a skin of a fuselage of an aircraft.

10. The load bearing structure according to claim 6, wherein said split stiffening elements of said first set are formed as longitudinal stringer members and wherein said stiffening elements of said second set are formed as circumferential frame members in a fuselage of an aircraft.

11. The load bearing structure according to claim 10, wherein the longitudinal stringer members are formed with substantially cross-sectional configuration.

12. The load bearing structure according to claim 10, wherein the circumferential frame members are formed with substantially C or U cross-sectional configuration.

13. The load bearing structure according to claim 6, wherein said split stiffening elements of said first set are formed as circumferential frame members and wherein the said stiffening elements of said second set are formed as longitudinal stringer members in a fuselage of an aircraft.

14. The load bearing structure according to claim 6, wherein said top surfaces of said split stiffening elements of the first set are attached to said split stiffening elements of said first set by bonding, welding, riveting or any combination thereof.

15. The load bearing structure according to claim 6, wherein at least one of said panel, and/or said split stiffening elements of said first set, and said stiffening elements of said second set is made of carbon fiber reinforced plastic, aluminum or any combination thereof.

16. A load bearing structure, comprising:
    a panel;
    a first set of split stiffening elements being provided on a surface of said panel and having bottom surfaces and central portions with clearances being spaced apart from each other in a first state; and
    a second set of stiffening elements being provided on said surface of said panel, having bottom surfaces and top surfaces and central portions and passing through said clearances of said first set of split stiffening elements for forming a grate structure in the first state of the first set of split stiffening elements, the bottom surfaces of the second set of stiffening elements resting upon the bottom surfaces of the first set of split stiffening elements in vicinity of said clearances;
    wherein the clearances are dimensioned in accordance with dimensions of the second set of stiffening elements to be inserted to facilitate insertion of corresponding stiffening elements of the second set, and
    wherein, in a second state, the first set of split stiffening elements further comprises top surfaces attached thereto to form a complete profile, the top surfaces of the first set of split stiffening elements being attached to the central portions of the first set of the split stiffening elements.

* * * * *